3,275,689
3 - ALKYLSULFONYL - 5 - (TERTIARYAMINOPROPYLIDENE)- AND 5-HYDROXY - 5 - (TERTIARY-AMINOPROPYL) - 5H - DIBENZO[a,d]CYCLOHEPTENES

Edward L. Engelhardt, Gwynedd Valley, Pa., assignor to Merck & Co., Inc., Rahway, N.J., a corporation of New Jersey
No Drawing. Filed Nov. 8, 1963, Ser. No. 322,498
5 Claims. (Cl. 260—570.8)

This application is a continuation-in-part application of my copending application, Serial No. 216,339, filed August 13, 1962, and now abandoned.

This invention relates to 5H-dibenzo[a,d]cycloheptenes. In particular, the invention relates to 5H-dibenzo[a,d]cycloheptenes which are substituted at their 5-position with a tertiary aminopropylidene radical and at the 3-position with a sulfonyl radical. The invention also relates to a process for preparing said compounds, to novel intermediates and their preparation.

The compounds encompassed within the scope of the present invention may be represented by the general structural formulae:

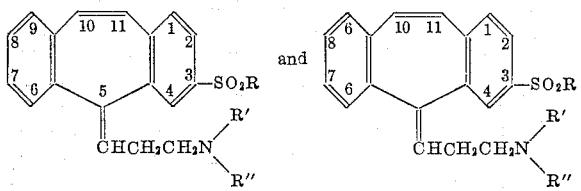

wherein R is an alkyl radical, either straight or branched chain, having up to 4 carbon atoms; and R' and R'', which can be similar or dissimilar, may be lower alkyl radicals having up to 6 carbon atoms and lower alkyl radicals linked together through an atom selected from the group consisting of carbon, nitrogen and oxygen to form a heterocyclic ring having from five to six atoms therein such as 1-piperidyl, 1-pyrrolidyl, 4-morpholinyl and 1-lower alkyl -4-piperazinyl. The compounds may have substituents on the propylidene chain such as lower alkyl radicals, preferably having from 1 to 4 carbon atoms.

Representative compounds encompassed within the scope of the present invention include:

5 - (3 - dimethylaminopropylidene) - 3 - methylsulfonyl-5H-dibenzo[a,d]cycloheptene
5 - (3 - dimethylaminopropylidene) - 3 - ethylsulfonyl-5H-dibenzo[a,d]cycloheptene
5 - (3 - dimethylaminopropylidene) - 3 - butylsulfonyl-5H-dibenzo[a,d]cycloheptene
5 - [3 - (1 - methyl - 4 - piperazinyl) - propylidene] - 3-methylsulfonyl-5H-dibenzo[a,d]cycloheptene
5 - [3 - (4 - morpholinyl) - propylidene] - 3- methylsulfonyl-5H-dibenzo[a,d]cycloheptene
5 - [3 - (1 - piperidyl) - propylidene] - 3 - methylsulfonyl-5H-dibenzo[a,d]cycloheptene
5 - [3 - (1 - pyrrolidyl) - propylidene] - 3 - methylsulfonyl-5H-dibenzo[a,d]cycloheptene.

The compounds of the invention can advantageously be employed in pharmaceutical applications because they have been found to possess both tranquilizing and antidepressant activity. In addition some of the compounds also possess antihistaminic activity.

The compounds are desirably administered orally or parenterally in the form of aqueous solutions or suspensions but they may also be administered in the form of tablets, powders, sustained release pellets and the like. When administered orally or parenterally, satisfactory results are obtained at a daily dosage level from about 25 mg. to about 500 mg. preferably given in divided doses over the day or in sustained release form. The compounds are preferably administered in the form of their acid addition salts and these salts are included within the scope of this invention.

In the preferred process, the compounds of the present invention are prepared by reacting the 3-bromo-5H-dibenzo[a,d]cyclohepten-5-one or 3-bromo-10,11-dihydro-5H-dibenzo[a,d]cyclohepten-5-one with a cuprous alkylmercaptide to form the corrseponding 3-alkylmercapto ketone, and then reacting this with a Grignard reagent and hydroyzing the resulting Grignard adduct to form the corresponding 3-alkylmercapto-5-hydroxy-5-(3-tertiary aminopropyl) derivative, oxidizing this to form the corresponding 3 - alkylsulfonyl - 5 - hydroxy - 5 - (3 - tertiaryaminopropyl)-derivative; then treating the reaction mixture with a reducing agent to reduce any N-oxide which may form and then dehydrating the latter 5-hydroxy derivative to form the desired compounds.

This may be illustrated generally as follows:

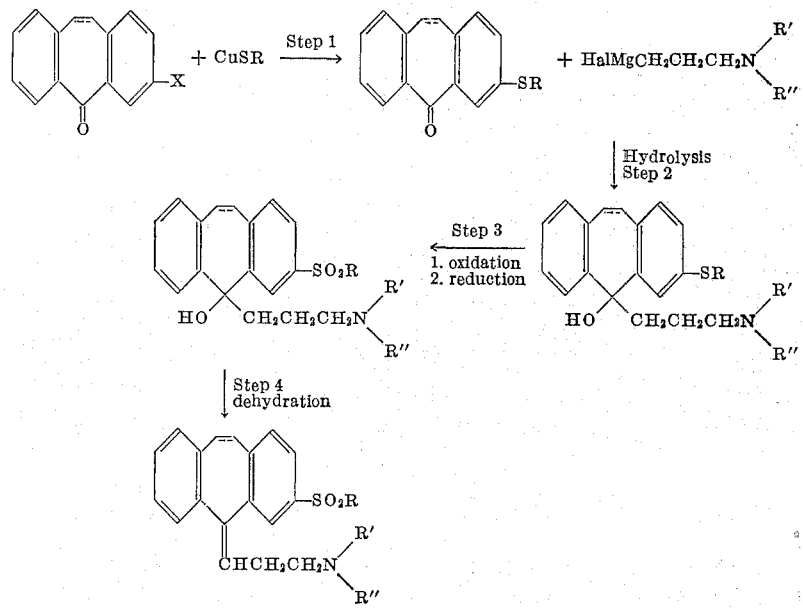

wherein X represents a halogen having an atomic weight of at least 79 and no greater than 127 and is preferably bromine, Hal represents halogen and is preferably chlorine or bromine and R, R' and R'' are as previously defined.

The dotted line between the 10 and 11 carbon atoms indicates that the compounds may be saturated or unsaturated at this location, the saturated compound being identified by the 10,11-dihydro designation.

The starting compounds, namely, the 5H-dibenzo[a,d]cyclohepten-5-one and 10,11-dihydro-5H-dibenzo[a,d]cyclohepten-5-one having a bromine or iodine substituent in the 3-position of the benzene ring may be prepared following the procedure described by S. O. Winthrop et al. for the preparation of 3-chloro-5H-dibenzo[a,d]cyclohepten-5-one, appearing in the J. Org. Chem., 27, 230–240 (1962). The 3-bromo-5H-dibenzo[a,d]cyclohepten-5-one and 3-bromo-10,11-dihydro-5H-dibenzo[a,d]cyclohepten-5-one compounds prepared in this manner had melting points of 108–109° C. and 79.5–80.5° C. respectively.

Step 1 of the process is carried out in an inert organic solvent, preferably an organic base having a high boiling point, preferably over 180° C., and at elevated temperatures up to the reflux temperature of the system. The ratio of reactants is not critical and equimolar amounts may be used although it is preferred to employ a small excess of the mercaptide. After completion of the reaction the mixture is washed with aqueous acid and the product recovered by extraction with a suitable organic solvent. Evaporation of the solvent yields the crude product which may be purified by crystallization or vacuum distillation.

The Grignard reagent employed in Step 2 of the process may be prepared by known procedures, but it has been found that it may be prepared in high yields as follows:

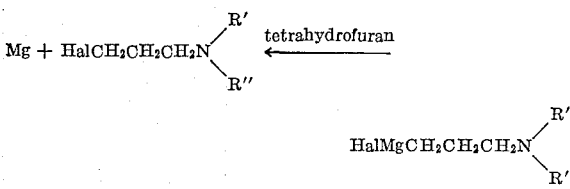

It has been found that the use of tetrahydrofuran as the solvent for the reaction results in a rapid production of the Grignard reagent in high yield.

The reaction with the Grignard reagent (Step 2) is preferably initially carried out under cooled conditions such as by the use of an ice-bath and finally may continue at room temperature. It has been found that tetrahydrofuran is an excellent solvent for carrying out the reaction, and, accordingly, the ketone may be added directly to the reaction mixture in which the Grignard reagent was prepared. However, any inert solvent for the reactants may be employed. Hydrolysis of the Grignard adduct is carried out in such a way that strongly acidic conditions are avoided, and water alone may be sufficient.

After the addition reaction is completed, the bulk of the solvent is removed by vacuum distillation, the Grignard adduct dissolved in a suitable solvent such as benzene and hydrolyzed by the addition of water or ammonium chloride solution with cooling. The product is recovered by evaporation of the solvent after separating inorganic material by filtration.

In Step 3 of the process, the alkylmercapto group of the 3-alkylmercapto-5-hydroxy-5-(3-tertiaryaminopropyl) derivative is oxidized using a suitable oxidizing agent such as hydrogen peroxide in glacial acetic acid, peracetic acid in glacial acetic acid, perbenzoic acid in glacial acetic acid and the like and then any N-oxide that may also be formed during oxidation is reduced using suitable reducing agents such as sodium sulfite and sulfur dioxide. Preferably the reduction is effected by saturating the mixture with gaseous sulfur dioxide. However, it is to be noted that the reduction may not be necessary where no or only small amounts of the N-oxide is formed or where high yields of the desired compound are not essential. The desired product is recovered by extraction with a suitable organic solvent after rendering the mixture alkaline. The crude product can be purified by crystallization.

The dehydration, Step 4, may be effected by means of such commonly used dehydrating agents as acetyl chloride, acetic anhydride, or thionyl chloride. The alcohol may be dehydrated directly or may be first converted to a salt such as the hydrochloride, hydrobromide or sulfate. Conversion to the salt prior to dehydration is preferable in some cases. The reaction may be carried out in an excess of dehydrating agent or a solvent such as chloroform or glacial acetic acid may be employed. The desired product is recovered after rendering the mixture alkaline by extraction with a suitable solvent and then removing the solvent.

A variation of the above procedure involves oxidizing the 3-alkylmercapto ketone obtained in Step 1 to the corresponding 3-alkylsulfonyl ketone using conventional oxidizing agents such as hydrogen peroxide, then condensing this with the Grignard reagent and hydrolyzing the resulting Grignard adduct employing the same conditions as set forth for Step 2 to form the corresponding 5-hydroxy-5-(3-tertiaryaminopropyl) derivative. This is then dehydrated in the manner described in Step 4 to form the desired compounds.

It will be appreciated by those skilled in the art that the compounds of the present invention exist as geometric isomers. The separation of these isomers can be achieved by conventional techniques such as is illustrated in the examples.

As has previously been pointed out the compounds of the present invention possess tranquilizing and anti-depressant activity. With certain compounds it has been found that one form is substantially more active than the other. This is particularly true of the compound 3-methylsulfonyl - 5 - (3 - dimethylaminopropylidene) - 5H - dibenzo[a,d]cycloheptene in which the β-form is the more active.

The preparation of representative compounds encompassed within the scope of the present invention is described in the following examples. However, it is to be understood that these examples are illustrative only and are not to be construed as in any way limiting the scope of the invention.

EAMPLE 1

*3-methylsulfoniyl-5-(3-dimethylaminopropylidene)-
5H-dibenzo[a,d]cycloheptene*

STEP A.—PREPARATION OF CUPROUS METHYLMERCAPTIDE

Concentrated ammonium hydroxide solution, 300 ml., is placed in a 1 liter, 3-necked flask fitted with a stirrer and gas inlet tube. The apparatus is cooled in an ice-bath and flushed with dry nitrogen while 40.0 g. (0.40 mole) of cuprous chloride is added portionwise with stirring. To the dark blue solution is added 95% ethanol, 300 ml., and then methylmercaptan is bubbled into the cooled solution until precipitation is complete and the supernatant solution becomes yellow. The solid is collected and washed by centrifugation with four portions of dilute ammonium hydroxide solution, followed by four portions of absolute ethanol. The yellow product is dried under reduced pressure at 45–50° C. and finally in a vacuum dessicator over concentrated sulfuric acid. The yield of product is 41.4 g. (93%).

STEP B.—PREPARATION OF 3-METHYLMERCAPTO-5H-DIBENZO[a,d]CYCLOHEPTEN-5-ONE 3-bromo-5H-dibenzo[a,d]cyclohepten - 5 - one, 7.93 g., (0.028 mole) and cuprous methylmercaptide, 4.01 g. (0.036 mole), prepared as described in Step A, are put in a 100 ml. flask fitted with a stirrer and reflux condenser. Quinoline, 44.8 ml., and pyridine, 4.0 ml., are added and the slurry is heated at 200° C. with stirring for six hours.

The reaction mixture is poured into 6 N hydrochloric acid, 120 ml., and ice and extracted with five 150 ml. portions of boiling benzene. The combined extracts are washed with three 200 ml. portions of 3 N hydrochloric acid. After washing with water the solvent is evaporated under reduced pressure leaving a brown oil, weight 7.41 g., as residue. The oil is dissolved in absolute methanol, 125 ml., and boiled with 370 mg. decolorizing carbon for thirty minutes. The filtrate is concentrated to 60 ml. and a yellow solid separates, along with a brown oil. The solid is mechanically separated from the oil and dried in a vacuum desicator over concentrated sulfuric acid. The product weighs 2.77 g. and melts at 66.5–67.5° C. The brown oil is evaporatively distilled at 146° C./0.1 mm. and the sublimate is crystallized from 25 ml. of absolute methanol to give 2.65 g. of material melting at 66.5–67.5° C. (77% yield).

*Analysis.*—Calculated for $C_{16}H_{12}OS$: C, 76.16; H, 4.80; S, 12.71. Found: C, 76.35; H, 4.61; S, 12.60.

STEP C.—PREPARATION OF 3-METHYLMERCAPTO-5-(3-DIMETHYLAMINOPROPYL)-5-HYDROXY-5H-DIBENZO[a,d]CYCLOHEPTENE

The Grignard reagent is prepared from 4.86 g. (0.2 g. atom) of magnesium and 24.34 g. (0.2 mole) of 3-dimethylaminopropyl chloride in 100 ml. of tetrahydrofuran as described in U.S. Patent 3,046,283. Step A of Example 2. The solution is standardized by determination of the magnesium content. A volume of the solution containing 0.043 mole of Grignard reagent is cooled in an ice-bath and stirred while a solution of 3-methylmercapto-5H - dibenzo[a,d]cyclohepten - 5 - one, 5.38 g. (0.0213 mole) in 28 ml. tetrahydrofuran, is added over a period of twenty minutes. The reaction mixture is stirred in an ice-bath for 30 minutes and at room temperature for ninety minutes. The bulk of the solvent is then distilled at 45° C. under reduced pressure and benzene, 70 ml., is added to the residue. The solution is cooled in an ice-bath and the Grignard adduct is hydrolyzed by the dropwise addition of water, 20 ml., with stirring. The benzene solution is separated and the gelatinuous residue is extracted three times with 50 ml. portions of boiling benzene. The combined benzene extracts are extracted with three 45 ml. portions of 0.5 M citric acid solution and washed once with 50 ml. $H_2O$. The combined aqueous solutions are made basic with sodium hydroxide solution and extracted with ether. The combined extracts are washed with water and evaporated under reduced pressure. The yellow solid residue, M.P. 127–129° C., weighs 6.88 g. (95%). Recrystallization from ethanol-water yields 6.50 g. of product melting at 128–129° C.

*Analysis.*—Calculated for $C_{21}H_{25}NOS$: C, 74.29; H, 7.42; H, 4.13. Found: C, 74.60; H, 7.56; N, 3.94.

STEP D.—PREPARATION OF 3-METHYLSULFONYL-5-(3-DIMETHYLAMINOPROPYL)-5-HYDROXY-5H - DIBENZO[a,d]CYCLOHEPTENE 3-methylmercapto-5-(3 - dimethylaminopropyl) - 5 hydroxy - 5H - dibenzo[a,d]cycloheptene, 21.53 g. (0.063 mole), is dissolved in glacial acetic acid, 250 ml., and the solution is cooled in an ice-bath while 30% hydrogen peroxide, 25.8 ml., is added dropwise with stirring. After standing at room temperature for twenty-four hours, the solution is saturated with sulfur dioxide for one hour with periodic cooling in an ice-bath. The solution is made basic with 10 N sodium hydroxide solution, 625 ml., and extracted with three 300 ml. portions of benzene. After washing the combined extracts with water, solvent is distilled under reduced pressure leaving a yellow oily residue, weight 23.20 g. The oil solidifies on standing at room temperature. Four recrystallizations from methanol-water gives 13.22 g. (57%) of product melting at 170.5–171.5° C.

*Analysis.*—Calculated for $C_{21}H_{25}NO_3S$: C, 67.89; H, 6.78; N, 3.77. Found: C, 67.72; H, 6.78; N, 3.59.

STEP E.—3-METHYLSULFONYL-5-(3-DIMETHYLAMINOPROPYLIDENE) - 5H - DIBENZO[a,d]CYCLOHEPTENE (MIXED GEOMETRIC ISOMERS)

3-methylsulfonyl-5-(3-dimethylaminopropyl) - 5 - hydroxy - 5H - dibenzo[a,d]cycloheptene (13.62 g., 0.037 mole) is dissolved in 136 ml. of trifluoroacetic acid. Trifluoroacetic anhydride, 68 ml., is added and the solution heated under reflux for 1 hr. in a water bath at 70° C. The dark green solution is cooled and poured into 250 ml. of ice-water. The mixture is rendered alkaline with 10 N sodium hydroxide solution while stirring and cooling and extracted with benzene. The benzene extract is washed with water, dried over sodium sulfate and the benzene distilled under reduced pressure. The mixed geometric isomers of 3-methylsulfonyl-5 - (3 - dimethylaminopropylidene)-5H-dibenzo [a,d]cycloheptene is obtained as a brown oily residue in a yield of 13.19 g. (theory, 13.08 g.).

STEP F.—α-ISOMER OF 3-METHYLSULFONYL-5-(3-DIMETHYLAMINOPROPYLIDENE) - 5H - DIBENZO[a,d] CYCLOHEPTENE HYDROCHLORIDE

The mixture of geometric isomers is dissolved in alcohol. One-half molar equivalent of dry hydrogen chloride dissolved in absolute alcohol is added and the solvent evaporated on a water-bath under reduced pressure. The residue is taken up in isopropyl alcohol and an equal volume of acetone is added. Absolute ether then is added to incipient cloudiness. The α-isomer separates as the crystalline hydrochloride, and is recrystallized to constant melting point. In one experiment the product so obtained sintered at 217° C. and melted at 218.5–219.5° C. clearing at 220.5° C.

*Analysis.*—Calculated for $C_{21}H_{23}O_2S \cdot HCl$: C, 64.68; H, 6.20; N, 3.59; Cl, 9.09. Found: C, 64.32; H, 6.35; N, 3.38; Cl, 8.78.

STEP G.—β-ISOMER OF 3-METHYLSULFONYL-5-(3-DIMETHYLAMINOPROPYLIDENE) - 5H - DIBENZO[a,d] CYCLOHEPTENE

The mother liquors from the separation of the hydrochloride of the α-isomer are evaporated and treated with one-quarter of a molar equivalent of hydrogen chloride in absolute alcohol. After evaporating the solvent the residue is treated with isopropyl alcohol and acetone and another crop of solid precipitated with ether as described in Step F. The mother liquors then are evaporated under reduced pressure and the residue shaken with dilute sodium hydroxide and benzene. The benzene layer is separated, washed with water and the benzene distilled under reduced pressure. The base of the β-isomer is covered with hexane and allowed to stand until partially crystalline. The base then is recrystallized to constant melting point from cyclohexane. The product obtained in a typical experiment sintered at 141° C., melted at 142.5–143° C., clearing at 144° C.

*Analysis.*—Calculated for $C_{21}H_{23}NO_2S$: C, 71.36; H, 6.56; N, 3.96. Found: C, 71.37; H, 6.52; N, 3.97.

EXAMPLE 2

*Preparation of 3-methylsulfonyl-5H-dibenzo[a,d]cyclohepten-5-one*

3-methylmercapto - 5H - dibenzo[a,d]cyclohepten - 5-one (10.70 g., 0.042 mole) is dissolved in 35 ml. of glacial acetic acid. Hydrogen peroxide (30%, 15 ml.) is added and the solution is stirred at room temperature for 65 hours. The white solid that precipitates is collected and dried to yield 10.81 g. (91%) of product melting at 158–159° C. An analytical sample from a previous experiment melts at 155–157.5° C. after recrystallization from 95% ethanol.

*Analysis.*—Calcd. for $C_{16}H_{12}O_3S$: C, 67.59; H, 4.26; S, 11.28. Found: C, 67.62; H, 4.25; S, 11.41.

EXAMPLE 3

*Preparation of 5-(3-dimethylaminopropyl)-5-hydroxy-3-methylsulfonyl-5H-dibenzo[a,d]cycloheptene*

The Grignard reagent is prepared from 4.86 g. (0.2 g. atom) of magnesium and 24.34 g. (0.2 mole) of 3-dimethylaminopropyl chloride in 100 ml. of tetrahydrofuran as described in U.S. Patent No. 3,046,283, Step A of Example 2. The solution is standardized by determination of the magnesium content. A volume of the solution containing 0.020 mole of Grignard reagent is cooled in an ice-bath and stirred while a solution of 3-methylsulfonyl-5H-dibenzo[a,d]cyclohepten-5 - one, 2.85 g. (0.010 mole), in 50 ml. of tetrahydrofuran is added over a period of thirty minutes. The reaction mixture is stirred in an ice-bath for thirty minutes and at room temperature for ninety minutes. The bulk of the solvent then is distilled below 45° C. under reduced pressure and the residue is dissolved in 35 ml. of benzene. The solution is cooled in an ice-bath and the Grignard adduct is hydrolyzed by the dropwise addition of water, 10 ml., with stirring. The benzene solution is decanted and the gelatinous residue is extracted three times with 30 ml. portions of boiling benzene. The combined benzene extracted with three 25 ml. portions of 0.5 M citric acid solution and washed once with 25 ml. of water. The combined aqueous solutions are rendered alkaline with sodium hydroxide solution and extracted with three 100 ml. portions of ether. The combined extracts are washed with water and evaporated under reduced pressure. The yellow solid residue is crystallized from methanol-water to yield, typically, 1.62 g. (44%) of product melting at 170–171.5° C. An analytical sample melts at 172–173° C. after further recrystallization from the same solvent mixture.

*Analysis.*—Calcd. for $C_{21}H_{25}NO_3S$: C, 67.89; H, 6.78; N, 3.77. Found: C, 67.72; H, 6.78; N, 3.59.

EXAMPLE 4

*Preparation of the α-isomer of 5-(3-dimethylaminopropylidene)-3-methylsulfonyl-10,11-dihydro-5H - dibenzo[a,d]cycloheptene*

The α-isomer of 5-(3 - dimethylaminopropylidene) - 3-methylsulfonyl - 5H - dibenzo[a,d]cycloheptene, 20.53 g. (0.058 mole), is dissolved in 130 ml. of absolute ethanol, one-half teaspoonful of Raney nickel catalyst is added, and the mixture is hydrogenated at 75° C. at an average hydrogen pressure of 525 p.s.i. The catalyst is separated by filtration and the solvent distilled under reduced pressure. The yellow oily residue is crystallized from cyclohexane. The product weighs, typically, 20.23 g. (98%) and melts at 121–122° C. An analytical sample from another experiment melts at 121–121.5° C.

*Analysis.*—Calcd. for $C_{21}H_{25}NO_2S$: C, 70.95; H, 7.09; N, 3.94. Found: C, 70.75; H, 7.13; N, 3.84.

EXAMPLE 5

*Preparation of the β-isomer of 5-(3-dimethylaminopropylidene)-3-methylsulfonyl-10,11-dihydro - 5H - dibenzo[a,d]cycloheptene*

The β-isomer of 5-(3 - dimethylaminopropylidene) - 3-methylsulfonyl - 5H - dibenzo[a,d]cycloheptene, 1.58 g. (0.0045 mole), is dissolved in 20 ml. of absolute ethanol, one-eighth teaspoonful of Raney nickel catalyst is added, and the mixture is hydrogenated at 75° C. at an average hydrogen pressure of 425 p.s.i. The catalyst is separated by filtration and the solvent distilled under reduced pressure leaving a yellow oily residue, weight 1.56 g. The product is crystallized from cyclohexane and the compound, which weighs 1.31 g. (82%), melts at 109–110° C.

*Analysis.*—Calcd. for $C_{21}H_{25}NO_2S$: C, 70.95; H, 7.09; N, 3.94. Found: C, 71.20; H, 6.97; N, 3.88.

What is claimed is:

1. A compound selected from the group consisting of compounds having the structural formulae

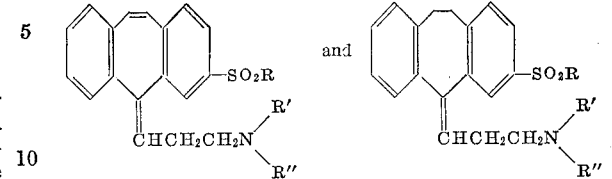

and non-toxic, pharmaceutically acceptable acid addition salts thereof; wherein R is a lower alkyl radical and R' and R" are selected from the group consisting of lower alkyl radicals and lower alkyl radicals linked together through an atom selected from the group consisting of carbon, nitrogen and oxygen to form a heterocyclic ring selected from the group consisting of 1-piperidyl, 1-pyrrolidyl, 4-morpholinyl and 1-lower alkyl-4-piperazinyl.

2. A compound selected from the group consisting of compounds having the structural formulae

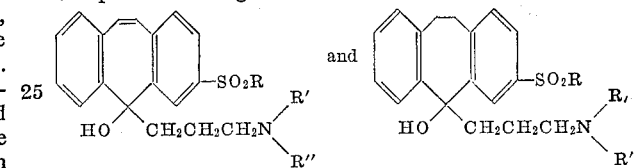

wherein R is a lower alkyl radical; and R' and R" are selected from the group consisting of lower alkyl radicals and lower alkyl radicals linked together through an atom selected from the group consisting of carbon, nitrogen and oxygen to form a heterocyclic ring selected from the group consisting of 1-piperidyl, 1-pyrrolidyl, 4-morpholinyl and 1-lower alkyl-4-piperazinyl.

3. 3 - methylsulfonyl - 5 - (3 - dimethylaminopropylidene)-5H-dibenzo[a,d]cycloheptene.

4. The β-isomer of 3-methylsulfonyl-5 - (3 - dimethylaminopropylidene)-5H-dibenzo[a,d]cycloheptene.

5. 3-methylsulfonyl-5-hydroxy-5 - (3 - dimethylaminopropyl)-5H-dibenzo[a,d]cycloheptene.

References Cited by the Examiner

UNITED STATES PATENTS

| | | | |
|---|---|---|---|
| 2,557,520 | 6/1951 | Skinner et al. | 260—609 |
| 2,761,873 | 9/1956 | Gregory et al. | 260—609 |
| 2,830,088 | 4/1958 | Hubner et al. | 260—570 |
| 2,888,459 | 5/1959 | Jacob | 260—243 |
| 2,908,683 | 10/1959 | Jacob | 260—243 |
| 2,944,054 | 7/1960 | Gordon | 260—243 |
| 3,019,266 | 1/1962 | Buc et al. | 260—607 |
| 3,055,903 | 9/1962 | Renz et al. | 270—328 |
| 3,084,160 | 4/1963 | Jacob et al. | 260—268 |
| 3,100,802 | 8/1963 | Reifschneider | 260—609 |
| 3,114,777 | 12/1963 | Reifschneider | 260—609 |
| 3,121,077 | 2/1964 | Keller et al. | 260—570 XR |
| 3,121,103 | 2/1964 | Keller et al. | 260—570 XR |

FOREIGN PATENTS

| | | |
|---|---|---|
| 215,424 | 6/1961 | Austria. |
| 356,759 | 10/1961 | Austria. |
| 646,048 | 11/1950 | Great Britain. |
| 858,186 | 1/1961 | Great Britain. |
| 858,187 | 1/1961 | Great Britain. |

OTHER REFERENCES

Villani et al., Jour. of Medicinal and Pharm. Chem., vol. 5, No. 2, pages 373–83 (1962).

Winthrop et al., Journ. Organic Chemistry, vol. 27, pages 230–40 (1962).

Reid, Organic Chemistry of Bivalent Sulfur, vol. 1, pages 107 and 144–5, and vol. II, pages 64–5 (1960).

CHARLES B. PARKER, *Primary Examiner.*

R. V. HINES, *Assistant Examiner.*